United States Patent
Moon et al.

(10) Patent No.: US 8,633,122 B2
(45) Date of Patent: Jan. 21, 2014

(54) METHOD OF MANUFACTURING ANODE FOR IN-SITU SINTERING FOR MOLTEN CARBONATE FUEL CELL

(75) Inventors: Hwan Moon, Seongnam-si (KR); Bo Hyun Ryu, Daejeon (KR); Jang Yong You, Yongin-si (KR); Ju Young Youn, Seoul (KR); Mi Young Shin, Daejeon (KR); Woon Yong Choi, Gunpo-si (KR); Tae Won Lee, Daejeon (KR); In Gab Chang, Daejeon (KR); Kil Ho Moon, Daejeon (KR)

(73) Assignee: Doosan Heavy Industries & Construction Co., Ltd., Changwon-Si (KR)

( * ) Notice: Subject to any disclaimer, the term of this patent is extended or adjusted under 35 U.S.C. 154(b) by 209 days.

(21) Appl. No.: 13/122,549

(22) PCT Filed: Feb. 26, 2009

(86) PCT No.: PCT/KR2009/000927
§ 371 (c)(1),
(2), (4) Date: Jun. 22, 2011

(87) PCT Pub. No.: WO2010/076915
PCT Pub. Date: Jul. 8, 2010

(65) Prior Publication Data
US 2011/0250521 A1    Oct. 13, 2011

(30) Foreign Application Priority Data
Dec. 30, 2008 (KR) .................. 10-2008-0137523

(51) Int. Cl.
*H01M 4/88* (2006.01)

(52) U.S. Cl.
USPC ........................................ 502/101; 429/533

(58) Field of Classification Search
USPC .................. 429/474, 475, 532, 533; 502/101
See application file for complete search history.

(56) References Cited

U.S. PATENT DOCUMENTS

| 4,554,225 | A | * | 11/1985 | Sounai et al. ............... 429/474 |
| 5,558,947 | A | | 9/1996 | Robison |
| 6,719,946 | B2 | | 4/2004 | Yuh et al. ...................... 419/2 |
| 2005/0050991 | A1 | | 3/2005 | Han et al. .................. 75/245 |
| 2008/0113251 | A1 | | 5/2008 | Yuh |
| 2008/0138683 | A1 | | 6/2008 | Yoshikawa |

FOREIGN PATENT DOCUMENTS

| JP | 61-224272 A | 10/1986 |
| JP | 62-015768 A | 1/1987 |
| JP | 22-88069 A | 11/1990 |
| JP | 2001-093532 A | 4/2001 |
| JP | 2008-166286 A | 7/2008 |
| KR | 20010038319 | 5/2001 |
| KR | 20030036964 | 5/2003 |
| KR | 20030070725 | 9/2003 |

OTHER PUBLICATIONS

Office Action in corresponding Japanese Patent Application No. 2011-530922 dated Jan. 23, 2013.

* cited by examiner

*Primary Examiner* — Stephen J. Kalafut
(74) *Attorney, Agent, or Firm* — Sughrue Mion, PLLC (57) ABSTRACT

Disclosed herein is a method of manufacturing an anode for in-situ sintering for a molten carbonate fuel cell, in which an anode green sheet is prepared using a slurry, and then a reinforcing layer is placed on the anode green sheet and then pressed, thereby improving the mechanical stability of a fuel cell stack and the long term stability of an anode, and an anode manufactured using the method.

5 Claims, 6 Drawing Sheets

FIG. 1

PRIOR ART

METHOD OF MANUFACTURING ANODE FOR IN-SITU SINTERING FOR MOLTEN CARBONATE FUEL CELL

TECHNICAL FIELD

The present invention relates to a method of manufacturing an anode for in-situ sintering for a molten carbonate fuel cell, and, more particularly, to a method of manufacturing an anode for in-situ sintering for a molten carbonate fuel cell, in which an anode green sheet is prepared using a slurry, and then a reinforcing layer is placed on the anode green sheet and then laminated, thereby improving the mechanical stability of a fuel cell stack and the long term stability of an anode, and to an anode manufactured using the method.

BACKGROUND ART

Generally, a molten carbonate fuel cell is an electrochemical power generation device for producing electricity using a hydrogen oxidation reaction and an oxygen reduction reaction.

$H_2 + CO_3^{2-} \leftrightarrow H_2O + CO_2 + 2e^-$ (anode: oxidation reaction) [Reaction Formula 1]

$\tfrac{1}{2}O_2 + CO_2 + 2e^- \leftrightarrow CO_3^{2-}$ (cathode: reduction reaction) [Reaction Formula 2]

Figure 1:
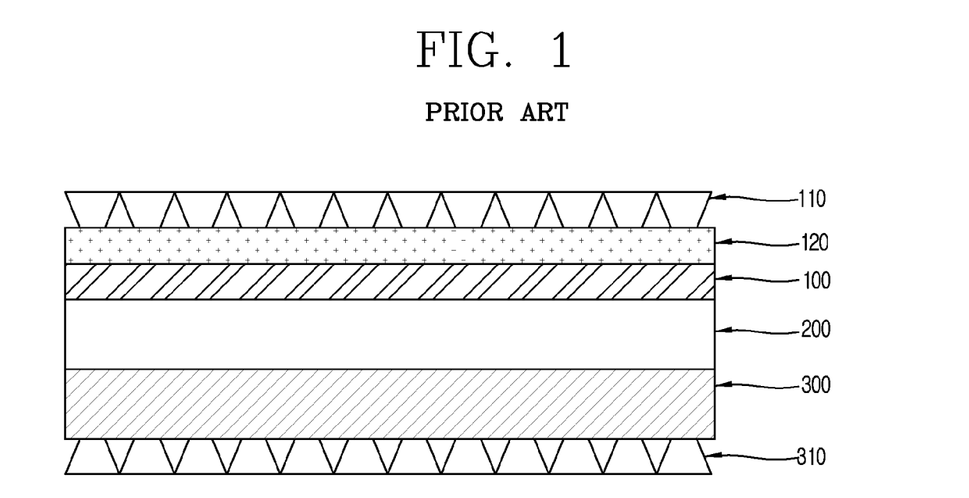
FIG. 1 is a schematic sectional view of a molten carbonate fuel cell.

As shown in FIG. 1, a molten carbonate fuel cell includes an anode 100, a matrix 200 and a cathode 300. The matrix 200 is impregnated with an electrolyte, thus causing ions to flow smoothly. The anode (fuel electrode) 100 serves to produce electrons by oxidizing fuel gas (generally, hydrogen) supplied through an anode current collector 110, and the cathode 300 serves to produce carbonate ions ($CO_3^{2-}$) by reacting the ions produced by the anode with oxygen or air and carbon dioxide supplied through a cathode current collector 310 and thus to consume electric charges. In this case, the carbonate ions produced by the cathode 300 is transferred from the cathode 300 to the anode 100 through the matrix 200 located between the anode 100 and the cathode 300, and the ions produced by the anode 100 flow through an external circuit. Therefore, a molten carbonate fuel cell must have an electrolyte distribution suitable for each component, and can produce electricity only when three-phase boundaries (fuel gas/liquid electrolyte/solid electrode) are sufficiently formed at an anode and a cathode.

An anode of a molten carbonate fuel cell must have good electrical conductivity, a sufficient reactive area for an electrochemical reaction and wettability suitable for an electrolyte. For this reason, nickel (Ni), which has excellent electrochemical activity, has been used as an anode of a molten carbonate fuel cell, and, particularly, a porous nickel (Ni) anode has been used in order to increase a reactive area between fuel gas and an electrolyte. However, a molten carbonate fuel cell is problematic in that it operates at a high temperature of 650° C., and operating pressure is applied to its stack in order to seal gas and to decrease the contact resistance between its components, and thus sintering and creep of the porous structure of an electrode easily occur. Further, a molten carbonate fuel cell is problematic in that the redistribution of an electrolyte and the decrease in the reactive area of an electrode are caused by the change of pore distribution, so that a matrix is easily cracked and crossover between fuel and oxygen occur.

During long-term operation of a molten carbonate fuel cell (MCFC), the deformation of an electrode structure, occurring in an anode, is chiefly caused by sintering and creep. The reason for this is that, since an electrode material of an anode exists in the form of metal, when the molten carbonate fuel cell (MCFC) is operated for a long time under a high temperature of 650° C. and a operating pressure of several Kgf/cm², sintering and creep phenomena occur. For this reason, in order to decrease the change in the material properties of an anode, such as anode sintering, pore growth, shrinkage, specific surface area loss and the like, which are causes of the deterioration in the performance of the molten carbonate fuel cell (MCFC) during the long-term operation of the molten carbonate fuel cell (MCFC), recently, research for optimizing the material properties of the anode by manufacturing an anode made of Ni—Al alloy, Ni—Cr alloy, Ni—Al—Cr alloy and the like selected from among Al, Ni, Cr and the like has been actively researched.

Referring to conventional methods of manufacturing an anode, Korean Patent Application No. 10-1999-0046260 discloses a method of manufacturing an alloy anode for a molten carbonate fuel cell, in which the high-temperature creep properties of an anode are improved using alumina formed by sequentially oxidizing and reducing an anode green sheet, and Korean Patent Application No. 10-2001-0067917 discloses a method of manufacturing an anode for a molten carbonate fuel cell coated with porous ceramic film, in which the high-temperature long-term stability of the molten carbonate fuel cell is ensured by coating the inner surfaces of pores with alumina or ceria. Further, Korean Unexamined Patent Application Publication No. 10-2003-0070725 discloses a method of manufacturing an anode for a molten carbonate fuel cell, in which the high-temperature compression resistance of an anode is improved by manufacturing the anode using nickel (Ni) and copper (Cu) and the sintering characteristics of Ni—Al alloy is improved by adding pure nickel (Ni) thereto.

However, the above methods are problematic in that a large-sized anode cannot be manufactured due to the control of microstructure, and in that production costs are increased because processes are complicated and a heat treatment process is performed.

In order to solve the above problems, Korean Unexamined Patent Application Publication No. 10-2003-0070725 discloses a case where an anode is directly inserted into a stack without heat treatment. However, the long term properties of the anode are not described in this patent document, and it is known through various research that the high-temperature creep properties of an anode cannot be improved using this method. Further, U.S. Pat. No. 5,558,947, filed by Energy Research Corp., discloses a rechargeable battery system in which the strength and long-term stability of an anode is increased and ensured by preparing a tape and then laminating the tape with a punching screen, but is disadvantageous in that it is difficult to fabricate a punching screen, and the punching screen is expensive, and thus it is difficult to ensure economical efficiency. Furthermore, U.S. Pat. No. 6,719,946, filed by FuelCell Energy Inc., discloses an anode support formed of a three-dimensional interconnected porous nickel plaque fabricated by sintering a bed of pure metallic nickel powder particles, but is also disadvantageous in that the anode support must be fabricated and then heat-treated, thus increasing production costs.

Therefore, the present inventors found a method of manufacturing an anode, in which an anode green sheet is fabricated, and then a reinforcing layer 120 is placed on the anode green sheet and then laminated, so that a large-size anode having excellent long-term properties can be produced in large quantities at low cost. Based on this finding, the present invention was completed.

DISCLOSURE OF INVENTION

Technical Problem

Accordingly, the present invention has been made to solve the above conventional problems, and an object of the present invention is to provide a method of manufacturing an anode for in-situ sintering for a molten carbonate fuel cell, in which a reinforcing layer is placed on an anode green sheet without heat treatment, so that the anode can be easily stacked, the production cost thereof can be decreased, and the high-temperature creep resistance, which is the greatest disadvantage of an anode, can be improved.

Another object of the present invention is to provide an anode for in-situ sintering for a molten carbonate fuel cell, having improved long-term stability, manufactured using the method.

Technical Solution

As an aspect, the present invention provides a method of manufacturing an anode for in-situ sintering for a molten carbonate fuel cell, which can form a stack without heat treatment by laminating an anode green sheet with a reinforcing layer, and which can ensure long-term stability and can improve strength and creep resistance.

In conventional methods of manufacturing a molten carbonate fuel cell (MCFC), an anode green sheet is fabricated and then sintered to form a hard anode, and then the hard anode is applied to a stack, or an anode green sheet is laminated with a punching screen, thus forming a stack without heat treatment. However, the present invention provides a method of manufacturing an anode for in-situ sintering for a molten carbonate fuel cell, which can decrease production cost due to the omission of heat treatment and the reduction of raw material consumption, and which can prevent the deterioration of properties during long-term operation thereof.

In the present invention, the anode for in-situ sintering is chiefly made of alloys of two or more metals selected from among nickel, aluminum and chromium. The composition of the initial alloy powder is influenced by the reactivity of an electrolyte. For example, Ni—Al alloy may be used.

In the present invention, powder and binder are uniformly dispersed in the anode green sheet, and thus organic matter such as the binder and the like can be easily removed at the time of heat treatment, and powder is uniformly distributed in the anode green sheet, and thus pores of 2~3 micrometers are formed in the anode green sheet. Therefore, the anode green sheet serves to easily supply fuel.

In the present invention, the reinforcing layer is made of nickel or stainless steel which does not react with carbonate (an electrolyte), and has elasticity for compensating for the constriction of powder due to the surface energy of powder at the time of operating a stack. Further, the reinforcing layer is not plasticized, and thus creep resistance is increased, thereby imparting long-term stability to the stack.

In the present invention, since the reinforcing layer provided in the anode for in-situ sintering increases the strength at the time of forming a stack, a stacking process can be easily conducted. Further, since the reinforcing layer maintains its strength at high temperature, the reinforcing layer serves to support the load of the stack.

In the present invention, the high-temperature strength characteristics and creep resistance of the anode sheet for in-situ sintering for a molten carbonate fuel cell may be changed depending on the kind and laminating type of the reinforcing layer.

An aspect of the present invention provides a method of manufacturing an anode for in-situ sintering for a molten carbonate fuel cell, including:

mixing metal powder, a solvent, a dispersant, a binder, a plasticizer and a defoamer and then ball-milling the mixture to prepare an anode slurry for in-situ sintering;

forming the anode slurry for in-situ sintering to fabricate an anode green sheet;

laminating the anode green sheet with a reinforcing layer through a hot roll press process or a hot uniaxial press process; and cutting the anode green sheet laminated with the reinforcing layer in a predetermined size.

Another aspect of the present invention provides a method of manufacturing an anode for in-situ sintering for a molten carbonate fuel cell, including:

mixing metal powder, a solvent and a dispersant and then primarily ball-milling the mixture to prepare a primary slurry;

mixing a solvent, a binder, a plasticizer and a defoamer to prepare a binder solution;

mixing the primary slurry with the binder solution and then secondarily ball-milling the mixture to prepare an anode slurry for in-situ sintering;

forming the anode slurry for in-situ sintering to fabricate an anode green sheet;

laminating the anode green sheet with a reinforcing layer through a hot roll press process or a hot uniaxial press process; and cutting the anode green sheet laminated with the reinforcing layer in a predetermined size.

In the method, the anode slurry for in-situ sintering may be formed into the anode form sheet through a tape casting process.

In the method, nickel mesh, a stainless steel mesh, a nickel foam, or a stainless steel foam may be used as the reinforcing layer placed on the anode green sheet.

A further aspect of the present invention provides an anode for in-situ sintering for a molten carbonate fuel cell, having improved long-term stability, manufactured by the method.

In the anode, the anode including the reinforcing layer may have a thickness of 0.1~0.9 mm.

Advantageous Effects

According to the method of manufacturing an anode for a molten carbonate fuel cell of the present invention, an anode slurry is prepared by mixing metal particles, organic matter, a solvent and the like with each other, the prepared anode slurry is formed into an anode green sheet through a tape casting process, the anode green sheet is placed thereon with a metal reinforcing layer and then pressed to increase high-temperature strength, and then the anode green sheet placed with the reinforcing layer is mounted on a stack without heat treatment, so that processes can be simplified, production cost can be decreased, and the sintering and creep phenomena of the anode, which are causes of the deterioration in long-term stability of the anode, can be prevented, thereby improving the performance and life of the molten carbonate fuel cell.

BRIEF DESCRIPTION OF DRAWINGS

The above and other objects, features and advantages of the present invention will be more clearly understood from the following detailed description taken in conjunction with the accompanying drawings, in which.

BEST MODE FOR CARRYING OUT THE INVENTION

Hereinafter, preferred embodiments of the present invention will be described in more detail with reference to the accompanying drawings.

Figure 2:
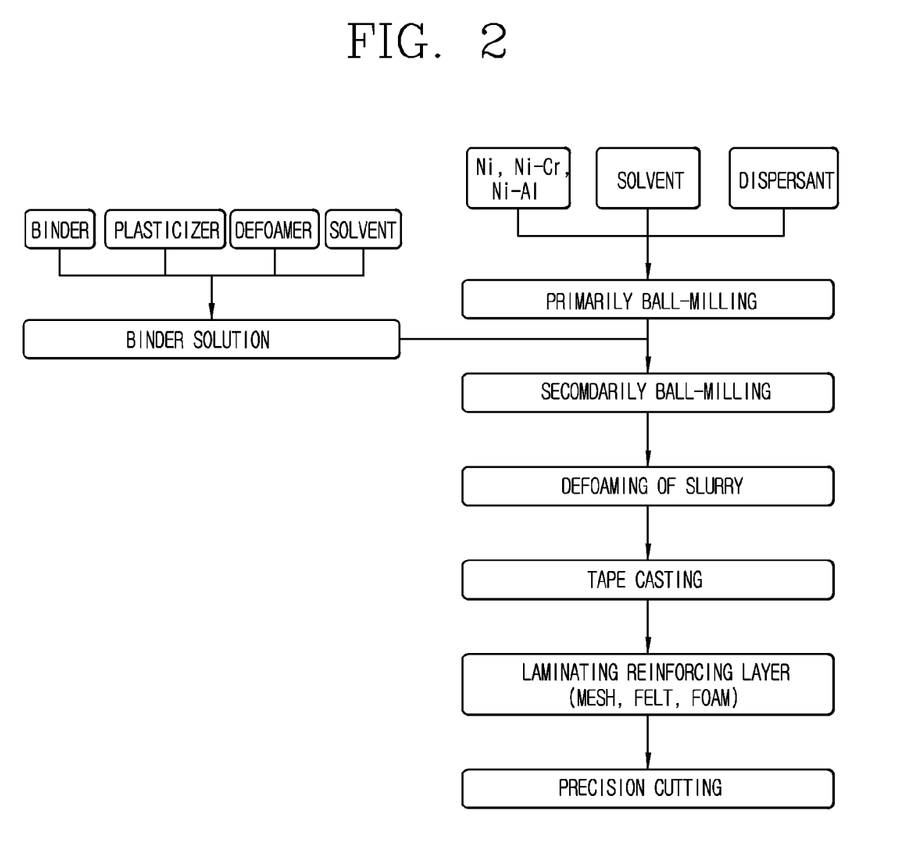
FIG. 2 is a flowchart showing a process of manufacturing an anode for in-situ sintering for a molten carbonate fuel cell according to the present invention.

FIG. 2 is a flowchart showing a process of manufacturing an anode for in-situ sintering for a molten carbonate fuel cell according to the present invention.

Referring to FIG. 2, a primary ball-milling process is performed by dissolving a dispersant in a solvent and then adding raw material powder particles for an anode for in-situ sintering thereto to prepare a primary slurry. After the primary ball-milling process, a secondary ball-milling process for preparing an organic slurry necessary for forming an anode for in-situ sintering is performed. The secondary ball-milling process is a process of mixing a binder, a plasticizer and a defoamer with a solvent in a predetermined ratio. Before the secondary ball-milling process, a binder, a plasticizer, a defoamer and the like are previously mixed with each other to prepare a binder solution, and then the binder solution is used in the secondary milling process. The primary slurry prepared through the primary ball-milling process is mixed with the binder solution through the secondary ball-milling process to prepare an anode slurry for in-situ sintering. The anode slurry for in-situ sintering undergoes a defoaming process for removing bubble and adjusting viscosity, and is then formed and dried.

In an embodiment of the present invention, in the primary or secondary ball-milling process, a milling velocity is calculated by a diameter of a container, the size of beads for milling may be variously selected in a range of 1 mm~3 cm in consideration of container size and particle characteristics, and the beads may be made of any one selected from among alumina, zirconia and mixtures thereof.

In an embodiment of the present invention, the anode for in-situ sintering may be made of any one selected from the group consisting of nickel (Ni) powder, aluminum (Al) powder, chromium (Cr) powder, and mixtures thereof or alloy powder thereof.

In an embodiment of the present invention, in order to improve the high-temperature strength characteristics of the anode for in-situ sintering, the two or more kinds of metal powder selected from the group consisting of nickel (Ni) powder, aluminum (Al) powder, chromium (Cr) powder, and mixtures thereof or alloy powder thereof may be used such that the weight ratio of the metal powder to nickel (Ni) is 0.5~50 wt %.

In an embodiment of the present invention, the metal powder used to make the anode for in-situ sintering may be added within the range of 20~100% of the total volume of the anode green sheet.

In an embodiment of the present invention, the metal powder may have various particle sizes as well as a single particle size.

In an embodiment of the present invention, the metal powder may be in various particle shapes such sphere, rod, needle, plate, mesh shapes or the like.

In an embodiment of the present invention, the binder may be selected from among vinyl-based binders, acrylic binders, cellulose binders, resin binders and mixtures thereof. The selection of the binder may be determined by the range in which the material properties and porosity of the anode green sheet can be adjusted. Specifically, the binder may be selected from the group consisting of polyvinyl butyral (PVB), polyvinyl alcohol (PVA), polyvinyl chloride (PVC), polymethylmethacrylate (PMMA), and mixtures thereof.

In the present invention, since the binder can be coagulated when it comes into contact with a powder slurry, a plasticizer and a defoamer are dissolved in a solvent, and then the binder is added thereto to prepare a binder solution, and then the binder solution is mixed with a sufficiently ball-milled powder slurry, thus performing the secondary ball-milling process.

In an embodiment of the present invention, the ball-milling process may be performed until the slurry is optimally dispersed by measuring the viscosity of the slurry.

In an embodiment of the present invention, the defoaming process may be performed until the viscosity of the slurry is in a range of 1,000~100,000 cPs.

In an embodiment of the present invention, the slurry may be formed into a plateshaped sheet through a tape casting process.

In an embodiment of the present invention, the sheet formed through the tape casting process undergoes a drying process to finally manufacture an anode for in-situ sintering. At this time, the drying process may be performed using hot air.

In the present invention, as the solvent, dispersant, plasticizer, defoamer and binder, those generally used in the tape casting process may be used.

Specifically, the solvent may be selected from the group consisting of cyclohexanone, ethyl alcohol, toluene, methyl ethyl ketone, isopropyl alcohol, methyl alcohol, acetone, xylene, and mixtures thereof.

Specifically, the plasticizer may be selected from the group consisting of phthalates such as n-butyl phthalate, butyl benzyl phthalate and butyl octyl phthalate, glycerines, glycols, and mixtures thereof.

In the present invention, the reinforcing layer may be selected from the group consisting of a nickel mesh, a stainless steel mesh, a nickel foam, a stainless steel foam, a nickel felt, a stainless steel felt, and mixtures thereof.

Specifically, the mesh has a single-layered structure in which wires overlap each other, the felt has a structure in which wires randomly overlap each other, and the foam has a structure similar to that of sponge.

In the present invention, the reinforcing layer may be laminated to the anode green sheet through a hot roll press process or a hot uniaxial press process.

In an embodiment of the present invention, the hot press process may be performed with heating to a temperature of 30~100° C. or without heating, and the hot roll press process may be performed at a pressure of 0~100 ton/cm, and the hot uniaxial press process may be performed at a pressure of 0~50 ton/cm$^2$.

In the present invention, the cutting of the anode green sheet may be conducted using a saw blade made of diamond or stainless steel.

MODE FOR THE INVENTION

Hereinafter, the present invention will be described in more detail with reference to the following Examples. However, a better understanding of the present invention may be obtained through the following examples which are set forth to illustrate, but are not to be construed as the limit of the present invention.

EXAMPLES 1 to 4

Manufacture of an Anode for in-situ Sintering and High-Temperature Creep Properties Thereof As shown in FIG. 2 and Table 1, an anode slurry was prepared, and then the prepared anode slurry was formed into an anode green sheet through a tape casting process. Subsequently, the anode green sheet was laminated with a reinforcing layer fabricated in the form of a nickel mesh, a nickel foam or a combination thereof as shown in Table 2, thereby manufacturing an anode for in-situ sintering. In this case, as metal powder used to form the anode green sheet, Ni—Al alloy powder having a weight ratio of Ni to Al of 98/2 was used.

Figure 3:
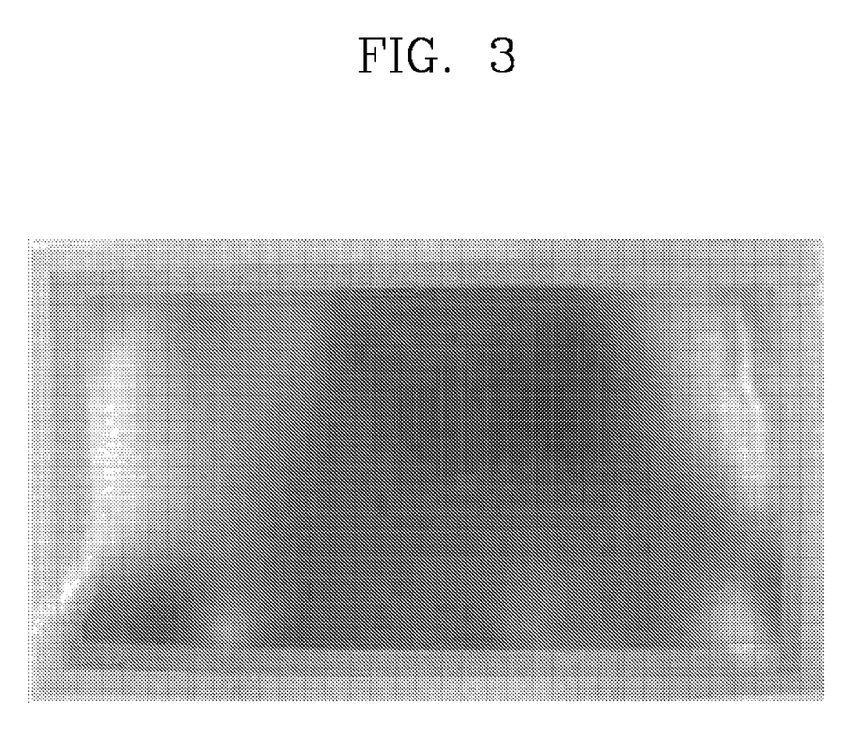
FIG. 3 is a photograph showing an anode for in-situ sintering according to an embodiment of the present invention.
Figure 4:
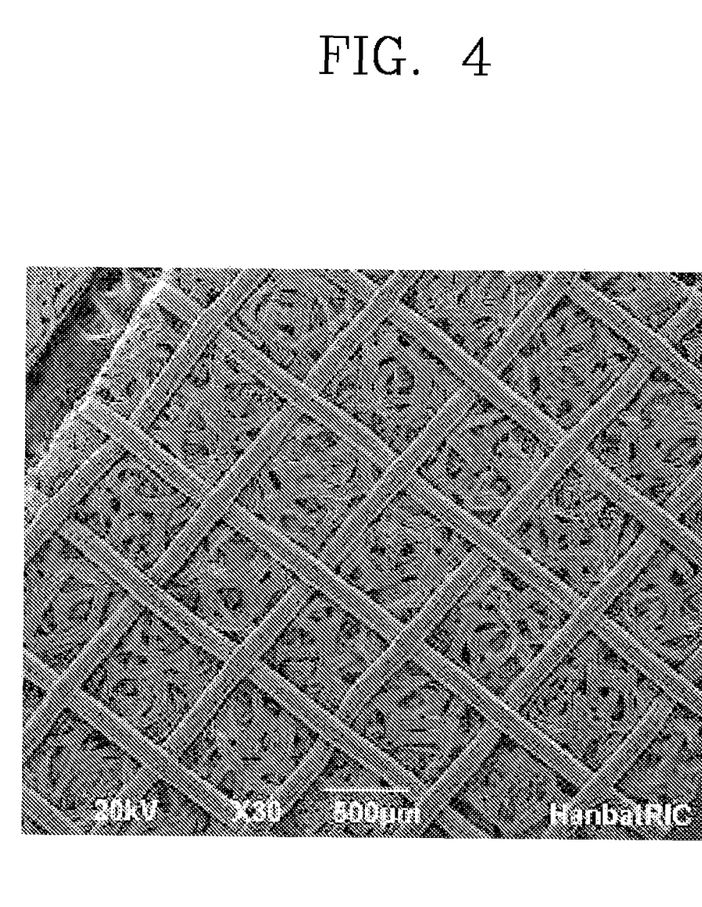
FIG. 4 is an expanded photograph showing an anode for in-situ sintering laminated with a reinforcing layer according to an embodiment of the present invention.

Subsequently, the manufactured anode shown in FIG. 3 was hot-pressed. From FIG. 4, it can be seen that the hot-pressed anode has excellent adhesivity and a uniform microstructure.

Figure 5:
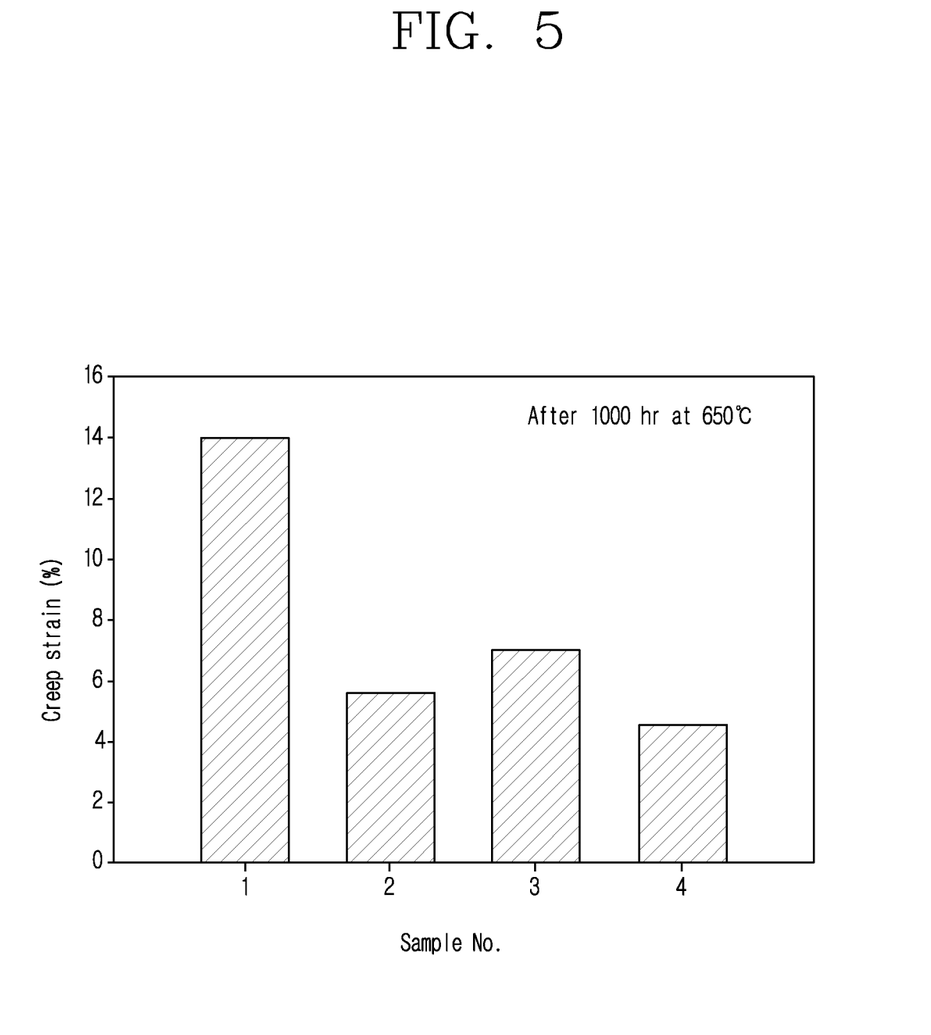
FIG. 5 is a graph showing the high-temperature creep properties of an anode for in-situ sintering depending on a reinforcing layer according to an embodiment of the present invention.
Figure 6:
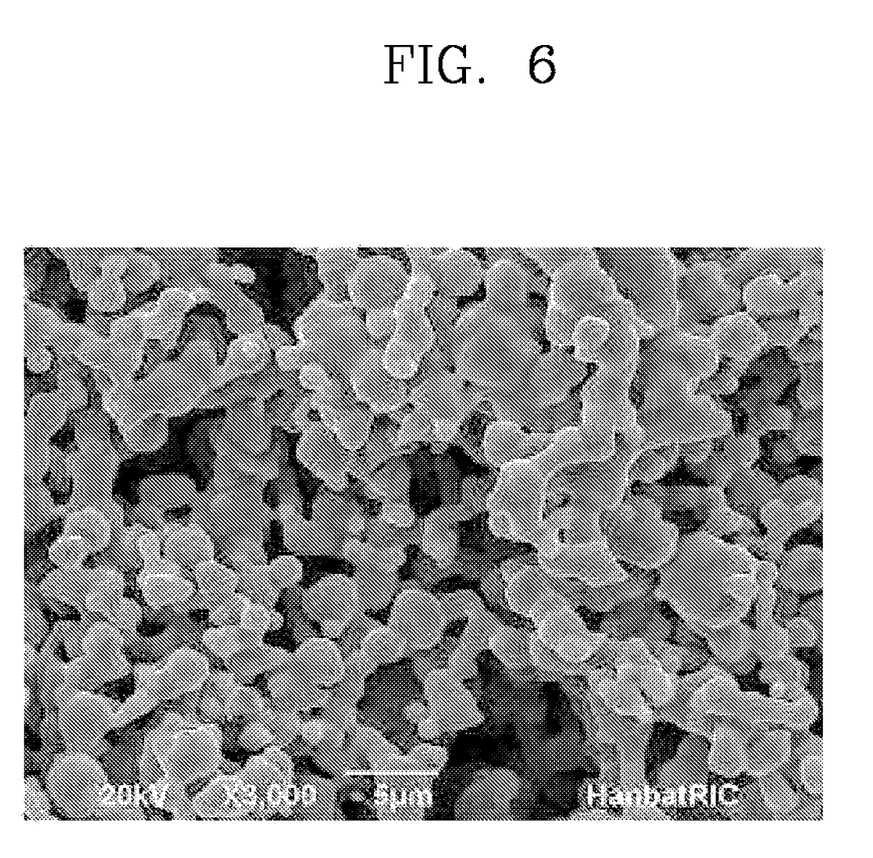
FIG. 6 is a photograph showing a microstructure of an anode for in-situ sintering after measuring its high-temperature creep properties.

The high-temperature creep properties of each of the manufactured anodes for in-situ sintering were analyzed, and the results thereof are shown in FIG. 5. As shown in FIG. 5, as the result of measuring the change in thickness of the anodes after maintaining them at 650° C. for 1000 hours, it can be seen that the anode laminated with a reinforcing layer has a high creep strain of 14%, whereas the anode laminated with no reinforcing layer has a low creep strain of 4.5~7%, thus the anode laminated with a reinforcing layer is not deformed by 50% or more compared to the anode laminated with no reinforcing layer. Further, as shown in FIG. 6, it can be seen that a microstructure of the anode also exhibits excellent properties.

TABLE 1

Slurry composition

| | kind | | weight ratio (%) |
|---|---|---|---|
| primary milling | powder | nickel-aluminum alloy | 70.1 |
| | solvent | toluene | 6.6 |
| | | ethanol | 2.8 |
| | dispersant | BYK-110 | 0.4 |
| secondary milling (binder solution) | defoamer | SN-D348 | 0.7 |
| | binder | BMA | 3.3 |
| | | Paraloid B72 | 5.0 |
| | plasticizer | DBP | 1.1 |
| | solvent | toluene | 7.1 |
| | | ethanol | 3.0 |
| total | | | 100.0 |

TABLE 2

Kinds of reinforcing layer and volume ratio per unit area thereof

| Example No. | | Example 1 | Example 2 | Example 3 | Example 4 |
|---|---|---|---|---|---|
| anode sheet | | 100 | 100 | 100 | 100 |
| kinds of reinforcing layer | nickel mesh | 0 | 100 | 0 | 50 |
| | nickel foam | 0 | 0 | 100 | 50 |

INDUSTRIAL APPLICABILITY

As described above, according to the method of manufacturing an anode for a molten carbonate fuel cell of the present invention, an anode slurry is prepared by mixing metal particles, organic matter, a solvent and the like with each other, the prepared anode slurry is formed into an anode green sheet through a tape casting process, the anode green sheet is placed thereon with a metal reinforcing layer and then pressed to increase high-temperature strength, and then the anode green sheet placed with the reinforcing layer is mounted on a stack without heat treatment, so that processes can be simplified, production cost can be decreased, and the sintering and creep phenomena of the anode, which are causes of the deterioration in long-term stability of the anode, can be prevented, thereby improving the performance and life of the molten carbonate fuel cell.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing an anode for in-situ sintering for a molten carbonate fuel cell, comprising: mixing metal powder, a solvent, a dispersant, a binder, a plasticizer and a defoamer and then ball-milling the mixture to prepare an anode slurry for in-situ sintering; forming the anode slurry for in-situ sintering to fabricate an anode green sheet; laminating the anode green sheet with a reinforcing layer through a hot roll press process or a hot uniaxial press process; and cutting the anode green sheet laminated with the reinforcing layer in a predetermined size.

2. The method of manufacturing an anode for in-situ sintering for a molten carbonate fuel cell according to claim 1, wherein the method comprising: mixing metal powder, a solvent and a dispersant and then primarily ball-milling the mixture to prepare a primary slurry; mixing a solvent, a binder, a plasticizer and a defoamer to prepare a binder solution; mixing the primary slurry with the binder solution and then secondarily ball-milling the mixture to prepare an anode slurry for in-situ sintering; forming the anode slurry for in-situ sintering to fabricate an anode green sheet; laminating the anode green sheet with a reinforcing layer through a hot roll press process or a hot uniaxial press process; and cutting the anode green sheet laminated with the reinforcing layer in a predetermined size.

3. The method of manufacturing an anode for in-situ sintering for a molten carbonate fuel cell according to claim 1, wherein the metal powder is selected from the group consisting of nickel (Ni) powder, aluminum (Al) powder, chromium (Cr) powder, mixtures thereof and alloy powder thereof.

4. The method of manufacturing an anode for in-situ sintering for a molten carbonate fuel cell according to claim 1, wherein the anode slurry for in-situ sintering is formed into the anode green sheet through a tape casting process.

5. The method of manufacturing an anode for in-situ sintering for a molten carbonate fuel cell according to claim 1, wherein the reinforcing layer placed on the anode green sheet is a nickel mesh, a stainless steel mesh, a nickel foam, or a stainless steel foam.

\* \* \* \* \*